United States Patent
Ariff et al.

(10) Patent No.: US 10,380,825 B2
(45) Date of Patent: Aug. 13, 2019

(54) FEEDER SYSTEM FOR FEEDING ITEMS

(71) Applicant: SIEMENS HEALTHCARE DIAGNOSTICS INC., Tarrytown, NY (US)

(72) Inventors: Gregory D. Ariff, Newark, DE (US); Donald R. Phillips, Newark, DE (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 25 days.

(21) Appl. No.: 14/229,056

(22) Filed: Mar. 28, 2014

(65) Prior Publication Data
US 2015/0279148 A1   Oct. 1, 2015

(51) Int. Cl.
G07F 11/44   (2006.01)
B65G 47/14   (2006.01)
B65D 88/66   (2006.01)

(52) U.S. Cl.
CPC .............. *G07F 11/44* (2013.01); *B65D 88/66* (2013.01); *B65G 47/145* (2013.01); *B65G 47/1407* (2013.01)

(58) Field of Classification Search
CPC ......... B65B 5/103; B65B 35/06; B65B 35/14; B65B 37/04; B65D 88/66; B65G 47/145; B65G 47/1407
See application file for complete search history.

(56) References Cited

U.S. PATENT DOCUMENTS

| | | | |
|---|---|---|---|
| 1,445,296 A | | 2/1923 | Clark |
| 3,747,810 A | * | 7/1973 | Graser .................. B65D 88/66 222/199 |
| 3,970,218 A | * | 7/1976 | Lee ....................... B65G 47/256 198/396 |
| 5,547,113 A | * | 8/1996 | Chen ..................... G01F 13/006 222/156 |
| 5,671,262 A | * | 9/1997 | Boyer .................... G06M 11/00 377/11 |
| 5,848,725 A | | 12/1998 | Saeki |

(Continued)

FOREIGN PATENT DOCUMENTS

| CH | 634795 A5 | 2/1983 |
|---|---|---|
| CN | 101746614 A | 6/2010 |

(Continued)

OTHER PUBLICATIONS

European Search Report of European Patent Application No. EP15160207.5, dated Aug. 13, 2015.

(Continued)

*Primary Examiner* — Gene O Crawford
*Assistant Examiner* — Kelvin L Randall, Jr.
(74) *Attorney, Agent, or Firm* — Dugan & Dugan, PC

(57) ABSTRACT

A feeder system for item feeding is presented. The feeder system may include a container having a plurality of walls, an actuator, a selector, and a chute. The container receives a plurality of items. An opening is formed in the container. The items flow through the opening towards the selector by a gravitational force. The selector singulates the plurality of items into one item. The chute receives the singulated item one at a time from the selector. The actuator is attached to the container and agitates the container to maintain a flow of the plurality of items passing through the opening.

20 Claims, 4 Drawing Sheets

(56) References Cited

U.S. PATENT DOCUMENTS

| | | | |
|---|---|---|---|
| 7,415,815 B2* | 8/2008 | Vodonos | G07F 11/44 |
| | | | 221/304 |
| 8,840,851 B2* | 9/2014 | Kowari | G01N 35/04 |
| | | | 221/10 |
| 2007/0023445 A1 | 2/2007 | Vodonos | |
| 2013/0068667 A1* | 3/2013 | Bezuidenhout | B29B 13/10 |
| | | | 209/247 |

FOREIGN PATENT DOCUMENTS

| | | |
|---|---|---|
| GB | 449166 A | 6/1936 |
| GB | 1414316 A | 11/1975 |
| GB | 2200899 A | 8/1988 |
| GB | 2421724 A | 7/2006 |
| JP | S5556917 A | 4/1980 |
| JP | H04112118 A | 4/1992 |

OTHER PUBLICATIONS

Geoffry Boothroyd, "Assembly Automation and Product Design", 2005, pp. 29-31 and 94-97, Second Edition, Taylor & Francis Group, Boca Raton, FL, US.
Chinese Search Report of Chinese Application No. 2015101336160 dated Feb. 27, 2018.

* cited by examiner

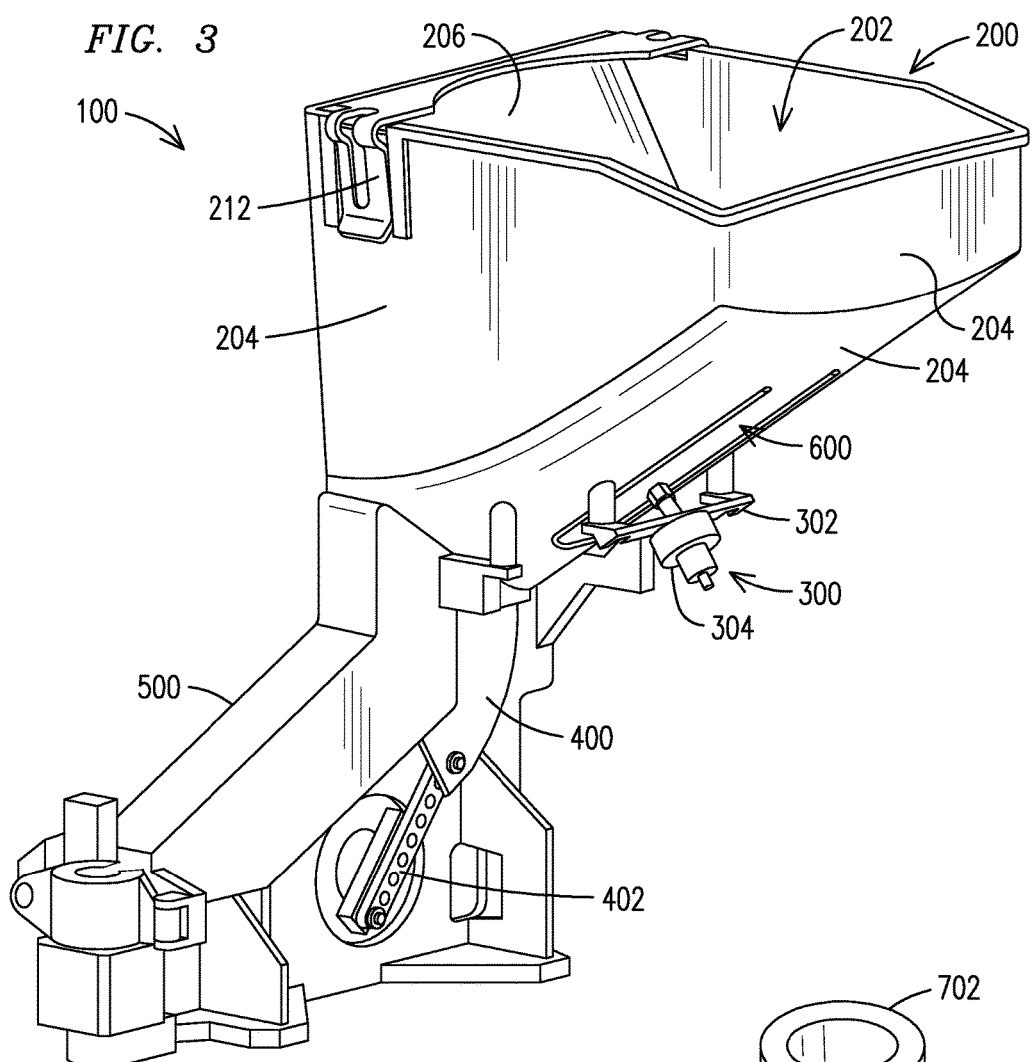
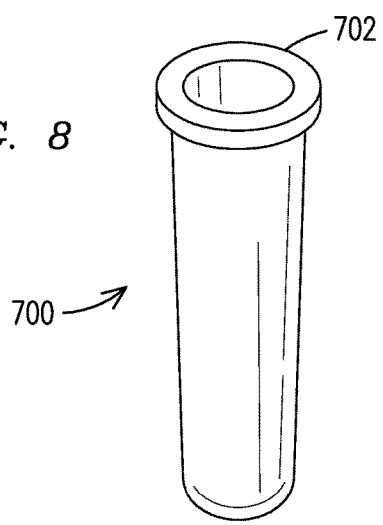

FEEDER SYSTEM FOR FEEDING ITEMS

FIELD

Aspects of the present invention relate to a feeder system.

DESCRIPTION OF RELATED ART

Small parts feeders which deliver singulated parts from a bulk reservoir generally utilize gravity to feed parts. Such feeding often suffers from low throughput due to the parts settling into a relatively stable configuration, thus preventing parts flow. Some feeders use an agitation that is achieved by other means such as vibration of the entire container, e.g. a hopper, or feeding track (e.g., vibratory bowl feeders). Such a configuration may cause the container to be damaged easily. Some feeders use an actuator which penetrates the container and is not integral to the container itself (e.g., reciprocating-tube feeders, centerboard container feeders, etc.). Such a configuration may be difficult to implement or manufacture.

Geoffry Boothroyd, "Assembly Automation and Product Design, Second Edition", Taylor & Francis Group 2005, discloses such feeders. FIG. 1 discloses a vibration-bowl feeder. FIG. 2 discloses a centerboard container feeder.

SUMMARY

Briefly described, aspects of the present invention relate to a feeder system.

According to an exemplary embodiment, a feeder system comprises a container, an actuator, a selector, and a chute. The container comprises a plurality of walls that defines a cavity of the container. The container is adapted to receive a plurality of items into the cavity. The actuator is carried by the container. The selector singulates the plurality of items into one item. An opening is formed in the container. The chute receives the singulated item one at a time from the selector. The selector is adapted to receive the plurality of items from the container via the opening by a gravitational force. The actuator is adapted to agitate the container to maintain a flow of the plurality of items passing through the opening.

According to an exemplary embodiment, a container comprises a plurality of walls, an actuator, and a selector. The plurality of walls defines a cavity of the container. The container is adapted to receive a plurality of items into the cavity. The actuator is carried by the container. The selector singulates the plurality of items into one item. An opening is formed in the container. The selector is adapted to receive the plurality of items from the container via the opening by a gravitational force. The actuator is adapted to agitate the container to maintain a flow of the plurality of items passing through the opening.

According to an exemplary embodiment, a method for feeding a plurality of items in a feeder system comprises receiving the plurality of items into a cavity of a container. The container comprises a plurality of walls that define the cavity. The container is agitated by an actuator. The plurality of items is singulated into one item by a selector. The singulated item is fed to a chute one at a time. An opening is formed in the container. The selector receives the plurality of items from the container via the opening by a gravitational force. The actuator agitates the container to maintain a flow of the items passing through the opening.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the present invention are explained in further detail with respect to the accompanying drawings. In the drawings:

FIG. 3 illustrates a perspective view of a feeder system of an exemplary embodiment of the present invention;

FIG. 8 illustrates a perspective view of a cuvette.

DETAILED DESCRIPTION OF INVENTION

Figure 1:
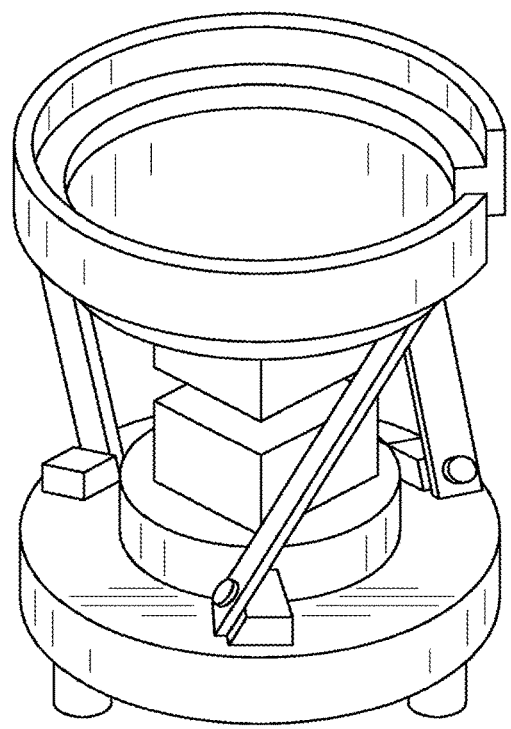
FIG. 1 illustrates a perspective view of conventional vibration-bowl feeder.
Figure 2:
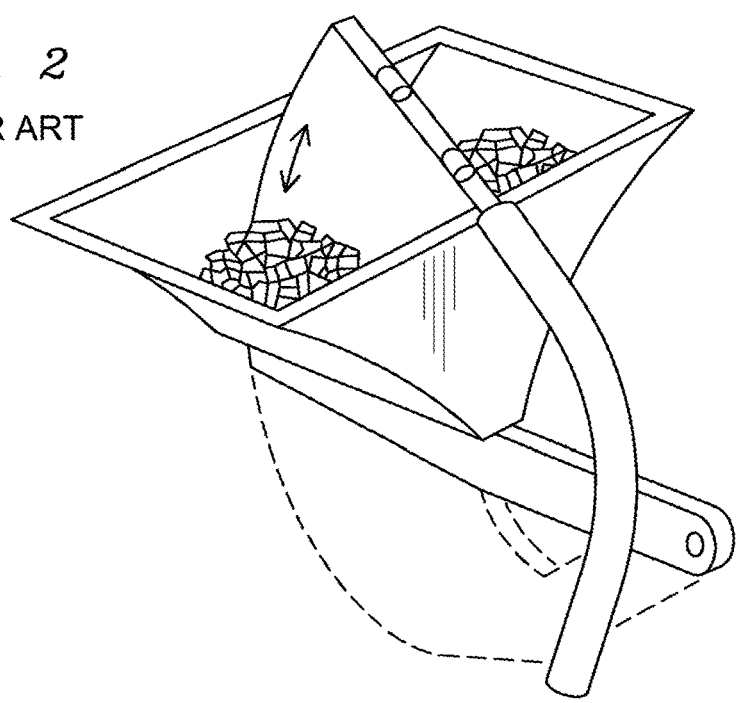
FIG. 2 illustrates a perspective view of conventional centerboard container feeder.

A detailed description related to aspects of the present invention is described hereafter with respect to the accompanying figures.

FIG. 3 illustrates perspective 3D view of a feeder system 100 according to an exemplary embodiment of the present invention. As seen in FIG. 3, a feeder system 100 comprises a container 200, an actuator 300, a selector 400, and a chute 500. In an exemplary embodiment, the container 200 may be a hopper.

According to an exemplary embodiment as illustrated in FIG. 3, a container 200 comprises a plurality of walls 204 and 206 that defines a cavity 202. In an exemplary embodiment, the plurality of walls comprises a dividing wall 206 that divides the cavity 202 into different regions. For example and without limitation, one of the different regions may comprise a region above the dividing wall 206. One of the different regions may comprise a region below the dividing wall 206. In an exemplary embodiment, at least one of the plurality of walls may include an angle that is greater than 0 degree and less than 90 degree respective to vertical.

According to an exemplary embodiment as illustrated in FIG. 3, an actuator 300 may be attached to a wall 204 via a bracket 302. In an exemplary embodiment, the bracket 302 may be mounted to the wall 204 by mounting element, such as, screws. However, it is understood that the mounting may be made in numerous ways. For example, the mounting may be made via an adhesive or via welding.

According to an exemplary embodiment as illustrated in FIG. 3, a selector 400 may be adapted to singulate a plurality of items into one item. In an exemplary embodiment, the selector 400 oscillates for singulating a plurality of items into one item and may be driven by a motor 402. In an exemplary embodiment, the selector 400 may be a ramp connected to the container 200.

According to an exemplary embodiment as illustrated in FIG. 3, a chute 500 may be adapted to receive the singulated one item from the selector 400 one at a time.

Figure 4:
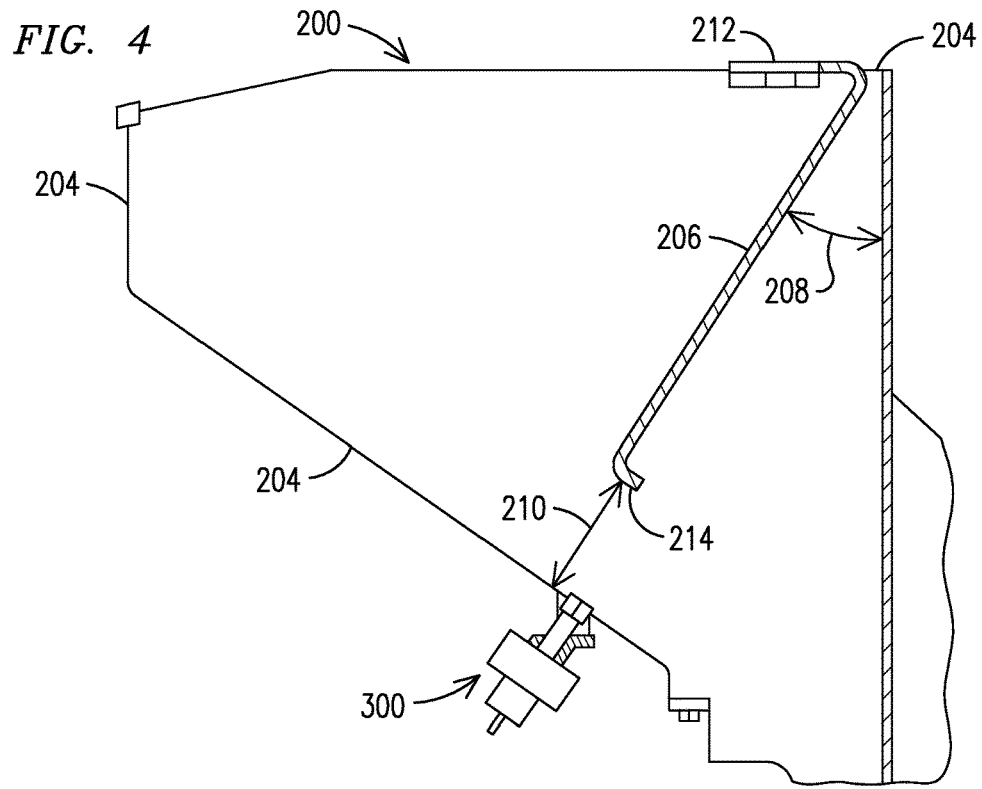
FIG. 4 illustrates a cross section view of a container illustrated in FIG. 3.

FIG. 4 illustrates a cross section view of a container 200 of the feeder system 100 illustrated in FIG. 3. According to an exemplary embodiment illustrated in FIG. 4, the dividing wall 206 extends from an edge of at least one of the walls 204 downwardly inside the container 200 with an angle 208 that is greater than 0 degree and less than 90 degree respective to vertical. The dividing wall 206 creates an opening 210 between its bottom edge 214 and a surface of at least one of the walls 204 of the container 200. Gravity acts on the plurality of items received by the container to flow through the opening 210 toward the selector 400.

According to an exemplary embodiment, the opening 210 may be adapted by positioning the dividing wall 206 to control a flow rate of the plurality of items toward the selector 400. Controlling the flow rate of the plurality of items via the opening 210 of the dividing wall 206 will limit a number of items being piled above the selector 400. Thereby a jamming of the selector 400 will be avoided by the limited number of items being piled above the selector 400.

The opening 210 may be adjusted, for example and without limitation, based on a flow rate of the selector 400 or based on a dimension of the plurality of items passing through the opening 210. In this case, the opening 210 may be proportional to the flow rate of the selector 400 such that the opening 210 may be larger for a higher flow rate than the opening 210 for a slower flow rate. The opening 210 may be adjusted to at least the smallest dimension of the plurality of items. However, it may be that the opening 210 may be adjusted to be larger than the largest dimension of the plurality of items. Adjusting the opening 210 according to the dimension of the plurality of items may control the flow rate of the plurality of items towards the selector 400.

According to an exemplary embodiment, the dividing wall 206 may be made from plastic. Other material, however, such as metal or laminate would be suitable. For example and without limitation, the dividing wall 206 may be transparent in order for an operator to see the feeding of the plurality of items to the chute 500.

In an exemplary embodiment, the dividing wall 206 comprises securing elements 212. The securing elements 212 secure the dividing wall 206 to a respective wall 204. The securing elements 212 may be adjustable securing elements so that the dividing wall 206 may be secured to the respective wall 204 at different locations. Thereby by securing the dividing wall 206 at different locations, the opening 210 may be adjusted accordingly. For example and without limitation, the securing elements 212 may be clamps.

Figure 5:
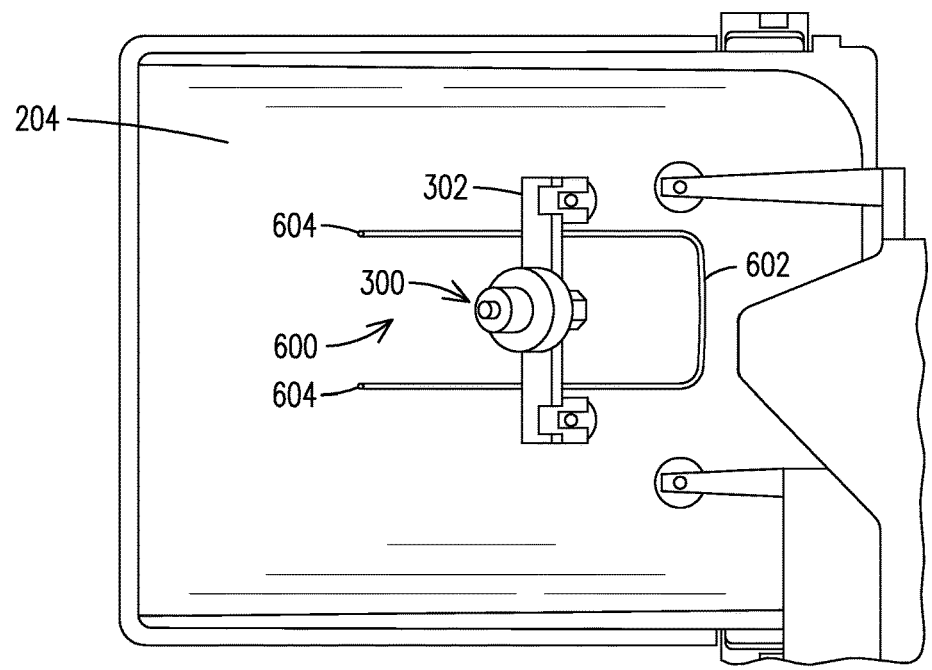
FIG. 5 illustrates a bottom view of the container illustrated in FIG. 3.

FIG. 5 illustrates a bottom view of a container 200 of the feeder system 100 illustrated in FIG. 3. According to an exemplary embodiment illustrated in FIG. 5, a flap 600 may be formed at a wall 204 of the container 200. The flap 600 may be formed, for example and without limitation, by a cut of a portion of the wall 204.

During operation of the feeder system 100, a stable configuration of the items may occur at the opening 210. The stable configuration of the items at the opening 210 may clog a flow of the items through the opening 210. This could reduce the flow of the items to the selector 400. During operation of the feeder system 100, the flap 600 when actuated by an actuator 300 disturbs the stable configuration of the items at the opening 210 to maintain the flow of the items passing through the opening 210. The actuation will be described in more detail below.

The container 200, for example without limitation, may be made from different types of material, such as plastic or sheet metal. A plastic container may be inexpensive. Furthermore, it may be easy to make a cut from the plastic container to form a flap. A plastic flap acts as a living hinge without further attachments. A sheet metal container may be durable but may be not easy to make a cut to form a flap. Additionally, a container made from sheet metal may necessitate a use of a hinge and mounting hardware.

According to an exemplary embodiment illustrated in FIG. 5, the flap 600 may comprise a moving end side 602 and a hinge end side 604. In the exemplary embodiment illustrated in FIG. 5, the moving end side 602 of the flap 600 is located closer to the selector 400 and the hinge end side 604 of the flap 600 is located further away from the selector 400 than the moving end side 602. Such a configuration may provide an adequate flow rate of the plurality of items passing through the opening 210 toward the selector 400 that requires less power of the actuator 300. However, it would be understood that this is merely one arrangement of the flap 600. For example and without limitations, the hinge end side 604 may be located closer to the selector 400. The hinge end side 604, for example and without limitations, may be located such that the hinge end side 604 and the moving end side 602 are equally spaced from the selector 400.

According to an exemplary embodiment illustrated in FIG. 5, the flap 600 may be a cut of a wall 204 to form a U shape flap 600. However, it is understood this is merely for illustration purposes. Other shapes such as triangular or semicircular may be used provided that the flap 600 is hinged. The shape of the flap 600 may be determined, for example and without limitation based on various factors.

A factor may include an ease or difficulty of cutting the wall 204 to form the flap 600 into a particular shape.

A factor may be based on a flow rate of the items through the opening 210. A larger flow rate of the items through the opening 210 may require a flap with a larger size of a surface area than a surface area of the flap for a smaller flow rate of the items through the opening 210.

A factor may be based on a stress applied to the flap 600, such as the hinge end side 604 when acting as a hinged panel. A larger dimension of the flap 600 between the moving end side 602 and the hinge end side 604 may apply a less stress applied to the hinge end side 604 than a smaller dimension.

A factor may be based on a power of the actuator 300. It is understood that an overall larger size of a surface area of the flap 600 may require a larger power of an actuator 300 to actuate the flap 600 acting as a hinged panel.

The flap 600 may be arranged on any wall 204 of the container 200. Furthermore, the flap 600 may be arranged in any position along the wall 204. In the exemplary embodiment illustrated in FIG. 4, the flap 600 is arranged on a wall 204 opposing the bottom edge 214 of the dividing wall 206. The wall 204 opposing the bottom edge 214 of the dividing wall 206 may adjoin the opening 210. According to the exemplary embodiment, the flap 600 is arranged in a region of the wall 204 opposing the bottom edge 214, where the region lies along a projection of the plane of the dividing wall 206. However, it is understood this configuration is merely for illustration purposes. Other arrangements of the flap 600 may be used to disturb a stable configuration of the items at the opening 210 for maintaining an adequate flow of the items through the opening 210.

According to an exemplary embodiment illustrated in FIG. 5, an actuator 300 may be attached to the flap 600 via a bracket 302. The bracket 302 may be mounted to a wall 204 via mounting elements on either side cross the flap 600 extending parallel along the opening 210.

For example and without limitation, the actuator 300 may be solenoid driven or linear motor driven. A solenoid driven actuator may be inexpensive and easy to implement. A linear motor driven actuator may be durable but may be expensive and may not be easy to implement compared to a solenoid driven actuator.

Figure 6:
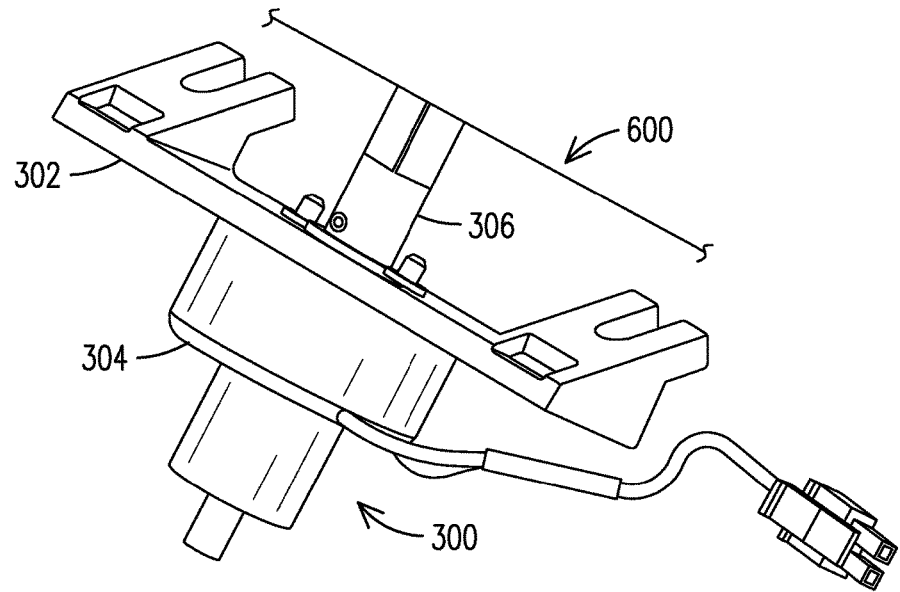
FIG. 6 illustrates a view of an actuator.

FIG. 6 illustrates a view of an exemplary embodiment of a solenoid driven actuator 300. As seen in FIG. 6, the solenoid driven actuator 300 comprises a body 304 and a plunger 306. The body 304 may be mounted to the bracket 302. The plunger 306 of the actuator 300 may be attached to a flap 600.

Figure 7:
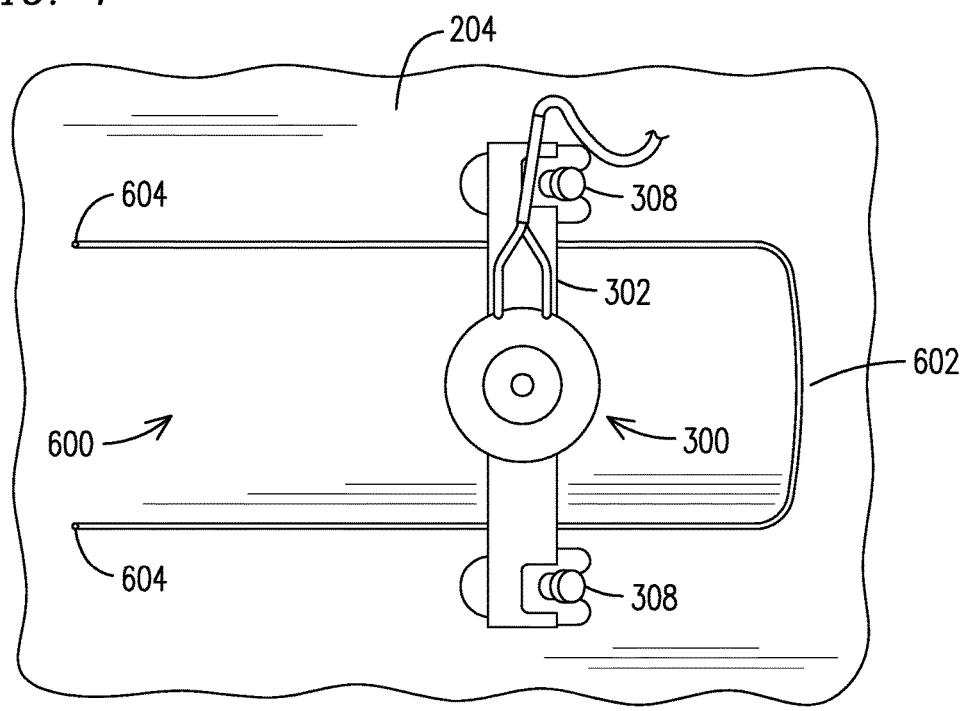
FIG. 7 illustrates a view of the actuator illustrated in FIG. 6 from a bottom of a wall.

FIG. 7 illustrates a view of the solenoid driven actuator 300 illustrated in FIG. 6 from a bottom of a wall 204. As seen in FIG. 7, the actuator 300 may be attached to the wall 204 via the bracket 302. According to an exemplary embodiment, the bracket 302 may be mounted to the wall 204 by mounting elements. In the illustrated exemplary embodiment, the mounting elements may be screws 308. However, it is understood that the mounting may be made in numerous ways. For example, the mounting may be made via an adhesive or via welding.

According to the exemplary embodiment, the bracket 302 may be mounted to the wall 204 at a location that is closer to the moving end side 602 of the flap 600 than the hinge end side 604 of the flap 600. This configuration requires a less power of the actuator 300 to actuate the flap 600 for providing an adequate flow rate of the plurality of items through the opening 210 toward the selector. However, it is understood this configuration is merely for illustration purposes. For example and without limitations, the bracket 302 may be mounted to the wall 204 at any location along the flap 600.

Operation of a feeder system 100 is briefly described hereafter. For illustration purpose, the operation of the feeder system 100 is described using cuvettes as the plurality of items. It would be understood this is merely an example and not limiting. Other types of plurality of items may be used for the feeder system 100.

FIG. 8 illustrates a perspective view of an exemplary embodiment of a cuvette 700 which may be used in a medical field. As seen in FIG. 8, the cuvette 700 may be in a cylindrical shape. According to an exemplary embodiment, a cuvette 700 may have a flange side 702 at top of the cuvette 700.

During an operation of the feeder system 100, a plurality of cuvettes 700 is poured into the container 200 on a top surface of the dividing wall 206. The plurality of cuvettes 700 received by the container 200 passes through the opening 210 of the container 200 by a gravitational force toward the selector 400. The selector 400 singulates the plurality of cuvettes 700 into one cuvette. The singulated one cuvette 700 may be fed to the chute 500 one at a time. The chute 500 feeds the singulated one cuvette 700 to an escapement mechanism. The singulated one cuvette 700 is presented to a loading arm at a specific location by the escapement mechanism.

In an exemplary embodiment, the selector 400 oscillates for singulating a plurality of cuvettes 700 into one item. The selector 400 may be driven, for example, by a motor 402. The selector 400 may get jammed if too many cuvettes 700 piled above the selector 400. The dividing wall 206 limits a plurality of cuvettes 700 can pile above the selector 400 via the opening 210. In an exemplary embodiment, a height of the cuvettes 700 that can pile above the selector 400 may be limited.

The plurality of cuvettes 700 may achieve a stable configuration at the opening 210 during operation of the feeder system 100. The stable configuration of the cuvettes 700 at the opening 210 may clog a flow of the cuvettes 700 through the opening 210. This could reduce the flow of the cuvettes 700 towards the selector 400.

During operation of the feeder system 100, the actuator 300 actuates the flap 600 of the container 200. The flap 600 acts as a hinged panel when actuated. The movements of the flap 600 disturb the cuvettes 700 that are stacked at the opening 210 to maintain a flow of the cuvettes 700 through the opening 210. The actuator 300 moves a part of the flap 600 to provide the movements of the flap 600. A movement of a moving part of the flap 600 may be determined to provide an adequate flow rate of the cuvettes 700 through the opening 210. A movement of a moving part of the flap 600 may be further determined so that the cuvettes 700 would not fall out from the container 200 through a gap between the moving part of the flap 600 and at least one of the walls 204 during the operation of the feeder system 100.

According to an embodiment, a flow rate of the cuvettes 700 through the opening 210 may be controlled by a frequency or a power of the actuator 300. A higher frequency or a larger power of the actuator 300 may provide a higher flow rate of the cuvettes 700 through the opening 210 towards the selector 400. A lower frequency or a less power of the actuator 300 may provide a less flow rate of the cuvettes 700 through the opening 210 towards the selector 400. A frequency or a power of the actuator 300 may be reduced to lower a flow rate of the cuvettes 700 through the opening 210 towards the selector 400 if too many cuvettes 700 are piled above the selector 400 to prevent a jam of the selector 400.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

LIST OF REFERENCES

100 Feeder system
200 Container
202 Cavity of the container
204 Walls of the container
206 Dividing wall
208 Angle of the dividing wall respective to vertical
210 Opening between bottom edge of the dividing wall and a surface of a wall
212 Securing elements
214 Bottom edge of the dividing wall
300 Actuator
302 Bracket
304 Body of the actuator
306 Plunger of the actuator
308 Screw
400 Selector
402 Motor
500 Chute
600 Flap
602 Moving end side of the flap
604 Hinge end side of the flap
700 Cuvette
702 Flange side of the cuvette

The invention claimed is:

1. A feeder system comprising:
a container adapted to receive a plurality of items, the container comprising a plurality of walls that define a cavity of the container, the plurality of walls including a first wall having a flap formed by a cut of a portion of the first wall;
an actuator attached to the first wall and to the flap outside of the cavity and configured to operate at a frequency;
a selector that singulates the plurality of items into one item; and
a chute adapted to receive the singulated item from the selector one at a time,
wherein an opening is formed in the container,
wherein the selector is adapted to receive the plurality of items from the container via the opening by a gravitational force, and
wherein the actuator is adapted to agitate the container at the frequency via movements of the flap to maintain a flow rate of the plurality of items passing through the opening.

2. The feeder system as claimed in claim 1, wherein the plurality of walls comprises a dividing wall that divides the cavity into different regions.

3. The feeder system as claimed in claim 2, wherein the dividing wall extends from an edge of at least one of the plurality of walls downwardly inside the container with an angle respective to vertical.

4. The feeder system as claimed in claim 3, wherein the dividing wall is secured at the edge of the at least one of the plurality of walls via a securing element.

5. The feeder system as claimed in claim 2, wherein the opening is formed between a bottom edge of the dividing wall and a surface of at least one of the walls.

6. The feeder system as claimed in claim 1, wherein the flap comprises a moving end side and a hinge end side.

7. The feeder system as claimed in claim 1, wherein the cut is arranged below the opening.

8. The feeder system as claimed in claim 1, wherein the cut is a U shape that forms the flap.

9. The feeder system as claimed in claim 1, wherein the actuator is attached to the flap via a bracket.

10. The feeder system as claimed in claim 9, wherein the bracket is mounted to the first wall on either side across the flap by a mounting element.

11. The feeder system as claimed in claim 1, wherein the actuator is solenoid driven.

12. The feeder system as claimed in claim 1, wherein a plunger of the actuator is attached to the flap.

13. The feeder system as claimed in claim 1, wherein the actuator is adapted to move the flap acting as a hinge panel to maintain the flow rate of the plurality of items passing through the opening.

14. The feeder system as claimed in claim 1, wherein the flap acts as a living hinge.

15. The feeder system as claimed in claim 1, wherein the plurality of the items comprises a plurality of cuvettes.

16. A container comprising:
a plurality of walls defining a cavity to receive a plurality of items, the plurality of walls including a first wall having a flap formed by a cut of a portion of the first wall;
an actuator attached to the first wall and to the flap outside of the cavity and configured to operate at a frequency; and
a selector that singulates the plurality of items into one item,
wherein an opening is formed in the container,
wherein the selector is adapted to receive the plurality of items from the container via the opening by a gravitational force, and
wherein the actuator is adapted to agitate the container at the frequency via movements of the flap to maintain a flow rate of the plurality of items passing through the opening.

17. The container as claimed in claim 16, wherein the flap is formed below the opening.

18. The container as claimed in claim 16, wherein the actuator is attached to the flap and moves the flap acting as a hinge panel to maintain the flow rate of the plurality of items passing through the opening.

19. A method for feeding a plurality of items in a feeding system comprising:
receiving the plurality of items into a cavity of a container, the container comprising a plurality of walls that define the cavity, the plurality of walls including a first wall having a flap formed by a cut of a portion of the first wall;
agitating the container by an actuator attached to the first wall and to the flap outside of the cavity and configured to operate at a frequency via movements of the flap;
singulating the plurality of items into one item by a selector that is oscillating; and
feeding the singulated item from the selector to a chute one at a time,
wherein an opening is formed in the container,
wherein the selector receives the plurality of items from the container via the opening by a gravitational force, and
wherein the actuator agitates the container at the frequency to maintain a flow rate of the items passing through the opening.

20. The method as claimed in claim 19, wherein the actuator moves the flap acting as a hinge panel to maintain the flow rate of the plurality of items passing through the opening further comprising cutting.

* * * * *